US008416455B2

(12) United States Patent
Sawada (10) Patent No.: US 8,416,455 B2
(45) Date of Patent: Apr. 9, 2013

(54) IMAGE PROCESSOR FOR CORRECTING IMAGE DATA (75) Inventor: Kazuhide Sawada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 380 days.

(21) Appl. No.: 12/697,173

(22) Filed: Jan. 29, 2010

(65) Prior Publication Data

US 2010/0195127 A1 Aug. 5, 2010

(30) Foreign Application Priority Data

Jan. 30, 2009 (JP) .................................. 2009-019833

(51) Int. Cl.
*G06F 15/00* (2006.01)
(52) U.S. Cl.
USPC ............. 358/1.9; 358/2.1; 358/504; 345/605; 345/535
(58) Field of Classification Search .................... 358/1.9, 358/2.1, 504; 345/605, 535
See application file for complete search history.

(56) References Cited

U.S. PATENT DOCUMENTS

| 5,442,408 | A | 8/1995 | Haruki |
| 5,739,809 | A | 4/1998 | McLaughlin et al. |
| 5,956,015 | A | 9/1999 | Hino |
| 6,505,002 | B2 | 1/2003 | Fields |
| 6,614,555 | B1 | 9/2003 | Hidaka |
| 6,847,374 | B2 | 1/2005 | Matsuda |
| 6,859,551 | B2 | 2/2005 | Ohga |
| 6,947,079 | B2 | 9/2005 | Parulski et al. |
| 6,987,586 | B2 | 1/2006 | Bogdanowicz et al. |
| 7,126,610 | B2 | 10/2006 | Hammond |

(Continued)

FOREIGN PATENT DOCUMENTS

| JP | H03-250992 A | 11/1991 |
| JP | H03-274884 A | 12/1991 |

(Continued)

OTHER PUBLICATIONS

Japan Patent Office; Office Action for Patent Application No. 2009-019833, mailed Nov. 9, 2010.

(Continued)

*Primary Examiner* — Twyler Haskins
*Assistant Examiner* — Michael Burleson
(74) *Attorney, Agent, or Firm* — Baker Botts L.L.P.

(57) ABSTRACT

An image-processor includes an acquiring unit and a correcting unit. The acquiring unit acquires image data and ambient light data indicating a degree of a first color temperature with respect to a second color temperature. The first color temperature represents a color temperature for a first ambient light. The second color temperature represents a color temperature for a second ambient light. A first image, which corresponds to the image data, is perceived in the first ambient light as an image having one color appearance. The first image is perceived in the second ambient light as an image having another color appearance. The correcting unit corrects the image data such that a color appearance of the first image under the first ambient light are reproduced under the second ambient light. The correcting unit corrects the image data based on the ambient light data such that an image based on the corrected image data is brighter as the second color temperature is higher than the first color temperature and such that the image corresponding to the corrected image data is darker as the second color temperature is lower than the first color temperature.

6 Claims, 6 Drawing Sheets

U.S. PATENT DOCUMENTS

| | | |
|---|---|---|
| 7,595,811 B2 | 9/2009 | Matsuda |
| 2002/0015043 A1 | 2/2002 | Matsuda |
| 2002/0044685 A1 | 4/2002 | Takahashi |
| 2003/0020725 A1 | 1/2003 | Matsuda |
| 2003/0090750 A1 | 5/2003 | Takahashi |
| 2003/0142377 A1 | 7/2003 | Yamada et al. |
| 2004/0085459 A1 | 5/2004 | Hoshuyama et al. |
| 2005/0149864 A1 | 7/2005 | Matsuzaki et al. |
| 2006/0187321 A1 | 8/2006 | Sakamoto |
| 2008/0129678 A1 | 6/2008 | Choi et al. |
| 2008/0137114 A1 | 6/2008 | Sanami |
| 2008/0303922 A1* | 12/2008 | Chaudhri et al. ......... 348/231.99 |
| 2009/0021526 A1* | 1/2009 | Chiang et al. ................. 345/605 |
| 2009/0195670 A1 | 8/2009 | Koishi |
| 2010/0165137 A1 | 7/2010 | Koishi |
| 2010/0195172 A1 | 8/2010 | Sawada |
| 2010/0195907 A1* | 8/2010 | Sawada ........................ 382/167 |

FOREIGN PATENT DOCUMENTS

| | | |
|---|---|---|
| JP | H11-004353 A | 1/1999 |
| JP | 2001-171186 A | 6/2001 |
| JP | 2002-152772 A | 5/2002 |
| JP | 2003-209855 A | 7/2003 |
| JP | 2003-209856 A | 7/2003 |
| JP | 2003-219176 A | 7/2003 |
| JP | 2003-234955 A | 8/2003 |
| JP | 2006-050424 A | 2/2006 |
| JP | 2006-173825 A | 6/2006 |
| JP | 2006-304316 A | 11/2006 |
| JP | 2007-265818 A | 10/2007 |
| JP | 2008-146228 A | 6/2008 |
| WO | 2008/050761 A1 | 5/2008 |

OTHER PUBLICATIONS

Japan Patent Office, Office Action for Japanese Patent Application No. 2009-019834 (counterpart to co-pending U.S. Appl. No. 12/696,503), mailed Nov. 9, 2010.

Japan Patent Office; Office Action for Patent Application No. 2009-019835, mailed Jan. 11, 2011.

United States Patent and Trademark Office, Office Action for U.S. Appl. No. 12/696,705 (U.S. Related Patent Application), dated Jul. 30, 2012.

* cited by examiner

IMAGE PROCESSOR FOR CORRECTING IMAGE DATA

CROSS REFERENCE TO RELATED APPLICATION

This application claims priority from Japanese Patent Application No. 2009-019833 filed Jan. 30, 2009. The entire content of the priority application is incorporated herein by reference.

TECHNICAL FIELD

The present invention relates to an image processor, a computer-readable storage medium storing a computer-executable image-processing program, and an image processing method for correcting image data used to render a printed image so that the colors in the printed image under a reference ambient light are reproduced under ambient light present where the printed image will be viewed.

BACKGROUND

Figure 6:
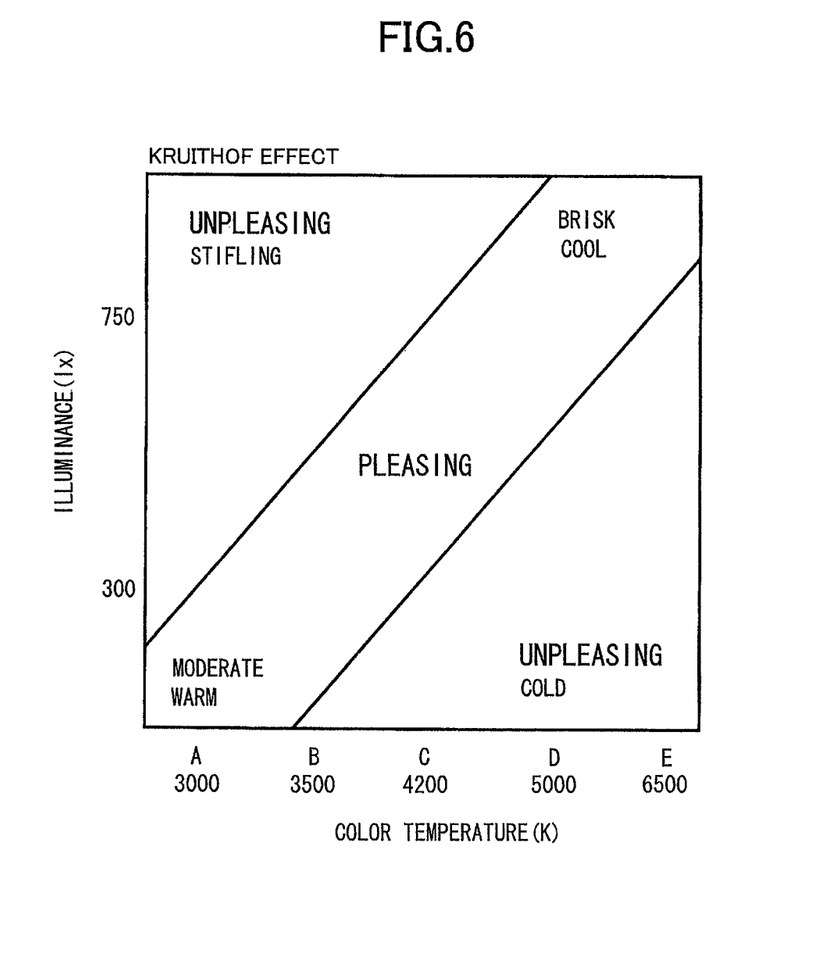
FIG. 6 is an explanatory diagram for Kruithof effect.

Various studies have been conducted on how different ambient lights (artificial and natural lights) affect humans differently. This effect, often called the Kruithof effect, indicates the psychological effect that ambient light has on humans. As shown in the graph of FIG. 6, light with a low color temperature is not pleasing to humans at high intensities, but is pleasing at low intensities. On the other hand, light with a high color temperature is not pleasing to humans at low intensities, but is pleasing at high intensities. Thus, the range of light intensities considered to provide pleasing illumination differs according to the color temperature of the ambient light. In FIG. 6, "A" indicates an incandescent lighting, "B" indicates a fluorescent lighting (warm white), "C" indicates a fluorescent lighting (white), "D" indicates a fluorescent lighting (cool white), and "E" indicates a fluorescent lighting (daylight).

Some conventional lighting fixtures have accounted for this Kruithof effect. For example, one such lighting fixture can emit light in a plurality of white colors, such as daylight, cool white, white, warm white, and extra warm white through a combination of blue LEDs having a high color temperature and yellow LEDs having a low color temperature. The lighting fixture produces the different white colors by adjusting the light intensity produced by the blue LEDs while keeping the intensity of the yellow LEDs fixed. Hence, the light intensity of the lighting fixture increases when the intensity of the blue LEDs increases (i.e., when the color temperature rises).

SUMMARY

However, it is well known that the same object observed under different ambient light may be perceived to have a different color. Studies have been conducted in the field of printing to determine whether it is possible to eliminate such differences in the way colors of a printed image are perceived when observing the image under different lighting conditions by correcting the image data.

However, while studies have been conducted on reproducing colors under different ambient lighting so that colors appear the same under each type of lighting, no study has yet been conducted on how to correct image data representing an image to be printed so that the printed image is properly perceived in the observation environment.

In view of the foregoing, it is an object of the present invention to provide an image processor, a computer-readable storage medium storing a computer-executable image-processing program, and an image-processing method capable of correcting image data for an image being printed so that the printed image is properly perceived in the observation environment.

In order to attain the above and other objects, there is provided an image-processor including an acquiring unit and a correcting unit. The acquiring unit acquires image data and ambient light data indicating a degree of a first color temperature with respect to a second color temperature. The first color temperature represents a color temperature for a first ambient light. The second color temperature represents a color temperature for a second ambient light. A first image, which corresponds to the image data, is perceived in the first ambient light as an image having one color appearance. The first image is perceived in the second ambient light as an image having another color appearance. The correcting unit corrects the image data such that a color appearance of the first image under the first ambient light are reproduced under the second ambient light. The correcting unit corrects the image data based on the ambient light data such that an image based the corrected image data is brighter as the second color temperature is higher than the first color temperature and such that the image corresponding to the corrected image data is darker as the second color temperature is lower than the first color temperature.

According to another aspect of the present invention, there is provided an image-processing method including:

acquiring image data and ambient light data indicating a degree of a first color temperature with respect to a second color temperature, the first color temperature representing a color temperature for a first ambient light, the second color temperature representing a color temperature for a second ambient light, a first image, which corresponds to the image data, being perceived in the first ambient light as an image having one color appearance, the first image being perceived in the second ambient light as an image having another color appearance; and correcting the image data such that a color appearance of the first image under the first ambient light are reproduced under the second ambient light, wherein the correcting corrects the image data based on the ambient light data such that an image corresponding to the corrected image data is brighter as the second color temperature is higher than the first color temperature and such that the image based the corrected image data is darker as the second color temperature is lower than the first color temperature.

According to another aspect of the present invention, there is provided a computer-readable storage medium storing a computer-executable image-processing program executable on an image-processor, the image-processing program including:

instructions for acquiring image data and ambient light data indicating a degree of a first color temperature with respect to a second color temperature, the first color temperature representing a color temperature for a first ambient light, the second color temperature representing a color temperature for a second ambient light, a first image, which corresponds to the image data, being perceived in the first ambient light as an image having one color appearance, the first image being perceived in the second ambient light as an image having another color appearance; and instructions for correcting the image data such that a color appearance of the first image under the first ambient light are reproduced under the second ambient light, wherein the instructions for correcting corrects the image data based on the ambient light data such that an image corresponding to the corrected image data is brighter as the second color temperature is higher than the first color temperature and such that the image based the corrected image data is darker as the second color temperature is lower than the first color temperature.

According to another aspect of the present invention, there is provided an image-processor including an acquiring unit, a first converting unit, a correcting unit, and a second converting unit. The acquiring unit acquires first image data and ambient light data indicating a degree of a first color temperature with respect to a second color temperature. The first color temperature represents a color temperature for a first ambient light. The second color temperature represents a color temperature for a second ambient light. A first image, which corresponds to the first image data, being perceived in the first ambient light as an image having a first color appearance. The first converting unit converts first image data based on the first color temperature to second image data. The correcting unit corrects the second image data such that an image corresponding to the corrected second image data is brighter as the second color temperature is higher than the first color temperature and such that the image corresponding to the corrected second image data is darker as the second color temperature is lower than the first color temperature. The second converting unit converts the corrected second image data based on the second color temperature to the third image data. A second image, which corresponds to the third image data, is perceived in the second ambient light as an image having a second color appearance. The first color appearance is the same as the second color appearance.

DETAILED DESCRIPTION

Next, a preferred embodiment of the present invention will be described while referring to the accompanying drawings.

1. Overall Structure of Communication System

Figure 1:
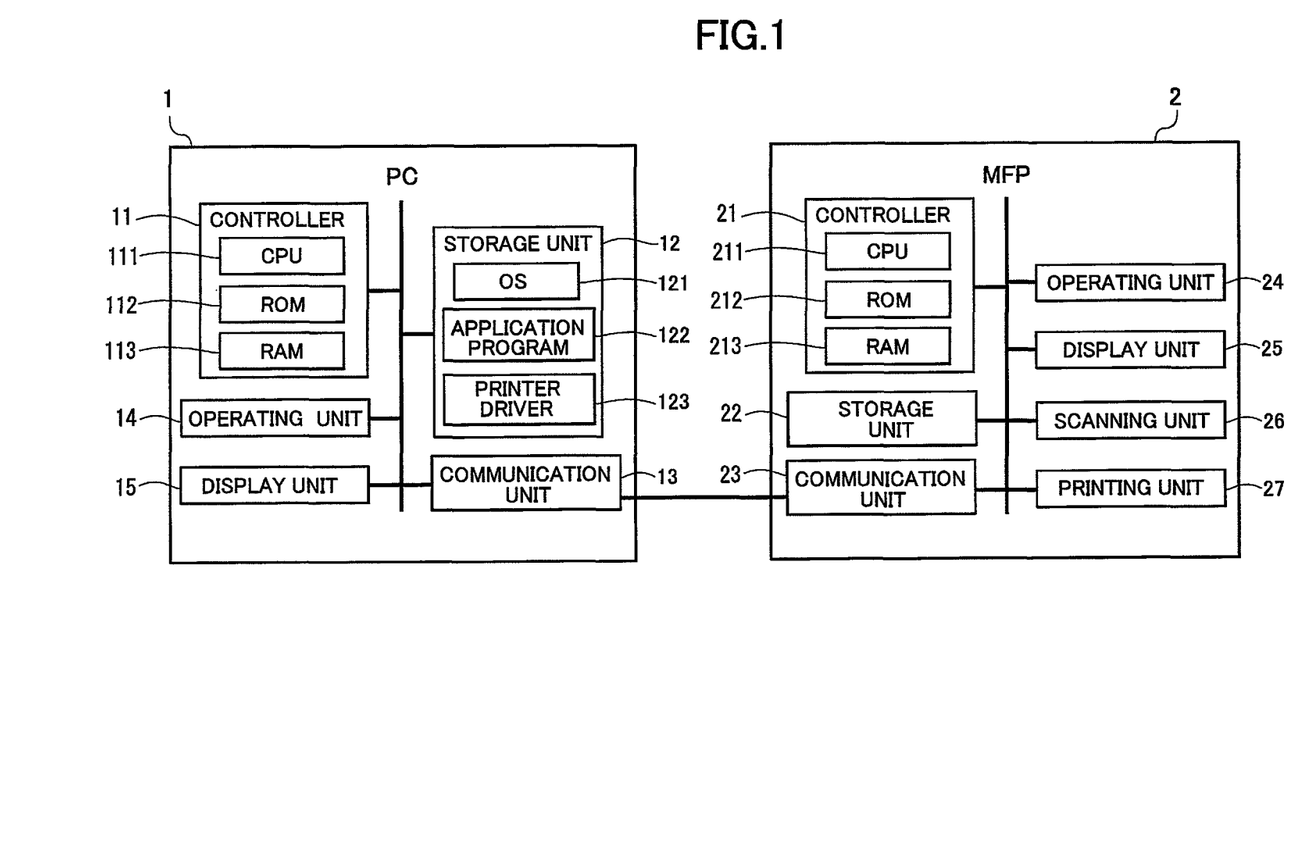
FIG. 1 is a block diagram showing a general structure of a communication system according to an embodiment of the present invention.

FIG. 1 is a block diagram showing the general structure of a communication system including a personal computer (PC) 1, and a multifunction peripheral (MFP) 2 that are capable of performing data communications with each other.

The PC 1 is a common data processor that includes a controller 11, a storage unit 12, a communication unit 13, an operating unit 14, and a display unit 15.

The controller 11 performs overall control of each component in the PC 1. The controller 11 includes a CPU 111, a ROM 112, and a RAM 113.

The storage unit 12 is a rewritable, nonvolatile storage device. In the preferred embodiment, the storage unit 12 is configured of a hard disk drive. The storage unit 12 has various programs installed thereon, including an operating system (OS) 121, an application program 122 for executing an application such as an image-browsing program, and a printer driver 123, which is a program that allows the PC 1 to use the MFP 2.

The communication unit 13 is an interface for performing data communications with the MFP 2.

The operating unit 14 is an input device that allows the user to input instructions through external operations. In the preferred embodiment, the operating unit 14 is configured of a keyboard and a pointing device (a mouse, touchpad, or the like).

The display unit 15 is an output device for displaying various data in a visual form that the user can understand. In the preferred embodiment, the display unit 15 is configured of a liquid crystal display.

The MFP 2 is a printing device that, in addition to a printer function, includes a scanner function, color copier function, and the like. The MFP 2 includes a controller 21, a storage unit 22, a communication unit 23, an operating unit 24, a display unit 25, a scanning unit 26, and a printing unit 27.

The controller 21 performs overall control of each component in the MFP 2. The controller 21 includes a CPU 211, a ROM 212, and a RAM 213.

The storage unit 22 is a rewritable, nonvolatile storage device. In the preferred embodiment, the storage unit 22 is configured of flash memory. The storage unit 22 stores programs for instructing the CPU 211 to implement processes described later with reference to FIGS. 3 and 4.

The communication unit 23 is an interface for performing data communications with the PC 1.

The operating unit 24 is an input device that allows the user to input instructions through external operations. The operating unit 24 includes various operating buttons.

The display unit 25 is an output device for displaying various data in a visual form that the user can understand. A compact liquid crystal display is used as the display unit 25 in the preferred embodiment.

The scanning unit 26 functions to scan images from an original document set in a prescribed scanning position and to generate image data representing the scanned image (more specifically, image data expressed in the RGB color space).

The printing unit 27 functions to print color images by ejecting ink droplets in the colors cyan (C), magenta (M), yellow (Y), and black (K) onto paper.

2. Outline of Processes Executed on Communication System

Next, a brief description will be given of the processes executed on the communication system according to the preferred embodiment.

In the PC 1 according to the preferred embodiment, the printer driver 123 is started when a printing operation is performed in a running application. When the printer driver 123 is started, a dialog box is displayed on the display unit 15 for setting printing conditions. After the user sets printing conditions in this dialog box, the PC 1 (printer driver 123) issues a print command to the MFP 2 and transmits image data representing the target image (and specifically image data expressed in the RGB color space) to the MFP 2. The MFP 2 performs a color conversion process for converting RGB image data received from the PC 1 together with the print command to image data in the CMYK color space, whose colors correspond to the colors of ink in the MFP 2. The MFP 2 subsequently prints an image based on the converted image data (i.e., the CMYK data).

The MFP 2 of the preferred embodiment also prompts the user to set the ambient light used as reference (hereinafter "target ambient light") and the ambient light in which the printed material is to be viewed (hereinafter "observation ambient light"). Subsequently, the MFP 2 prints the image after performing an ambient light correction process for correcting the image data in order that the colors of the printed image under the target ambient light are reproduced under the observation ambient light. That is, a color appearance of the printed image under the observation ambient light are perceived as a color appearance that is the same as a color appearance of the printed image under the target ambient light, by the user.

Figure 2:
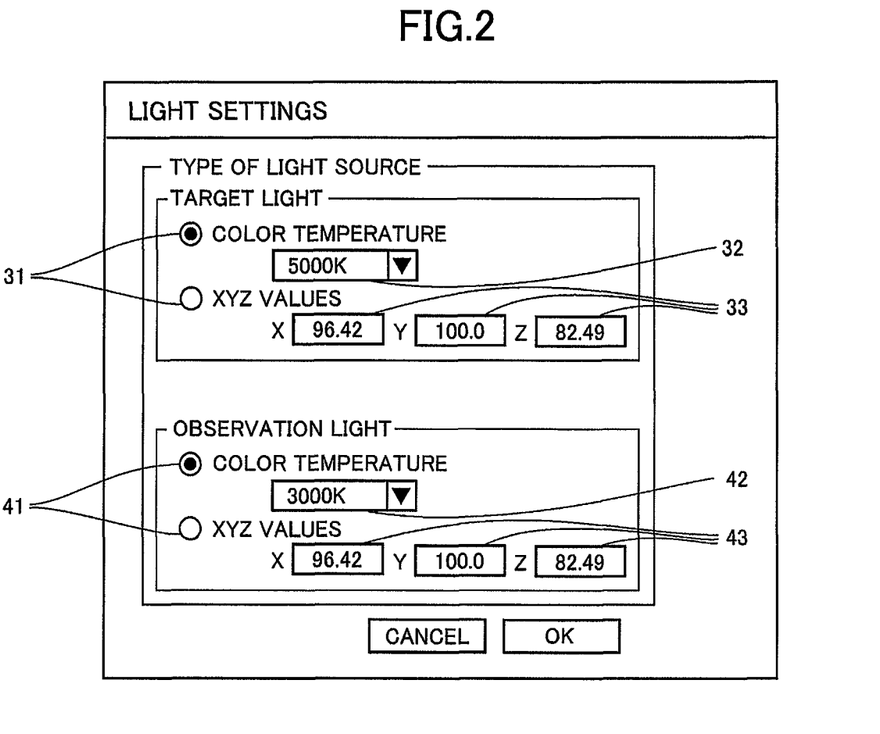
FIG. 2 is an explanatory diagram showing a dialog box of a printer driver according to an embodiment of the present invention.

Specifically, in the dialog box of the printer driver 123 shown in FIG. 2, the user can set various data indicating the target ambient light and the observation ambient light. In the example shown in FIG. 2, the dialog box includes radio buttons 31 and 41 for the target ambient light and the observation ambient light, respectively, that allow the user to select either "Color temperature" or "XYZ values" as the method of specifying ambient light settings. When specifying the color temperature setting method, the user can then select a specific color temperature for the target ambient light and observation ambient light from pull-down boxes 32 and 42. When specifying the XYZ value setting method, the user then inputs specific numbers as X, Y, and Z values in respective numerical input boxes 33 and 43.

The printer driver 123 of the PC 1 then transmits the data set above for the target ambient light and observation ambient light together with a print command to the MFP 2 as target ambient light data (Xt, Yt, Zt) and observation ambient light data (Xo, Yo, Zo). XYZ values are also prestored for the color temperatures that can be selected from the pull-down boxes 32 and 42. Therefore, if the user has selected the color temperature method, the printer driver 123 transmits these prestored XYZ values to the MFP 2. Hence, XYZ values representing the color of the target ambient light and the color of the observation ambient light are transferred to the MFP 2, regardless of which setting method was selected. The XYZ values are values within the range 0-100. Before being used by the MFP 2, they are normalized to values within the range 0-1.

By prompting the user to specify the target ambient light and observation ambient light in this way and subsequently performing ambient light correction on the image data, the MFP 2 can mitigate differences in how colors of the printed image are perceived due to differences in ambient light under which the printed image is viewed.

It is a particular feature of the MFP 2 according to the preferred embodiment to adjust the brightness of the printed image based on the color temperature in the observation ambient light in order that the MFP 2 can produce a printed image that can be suitably viewed in the observation environment. As described above with reference to the Kruithof effect, light having a low color temperature is not pleasing at a high intensity, but is pleasing at a low intensity, while light having a high color temperature is not pleasing at a low intensity, but is pleasing at a high intensity. Accordingly, the MFP 2 according to the preferred embodiment corrects image data so that the printed image is brighter as the color temperature of the observation ambient light is higher than the color temperature of the target ambient light and so that the printed image is darker as the color temperature of the observation ambient light is lower than the color temperature of the target ambient light.

3. Process Executed by MFP

Next, detailed steps in the process executed on the MFP 2 will be described.

Figure 3:
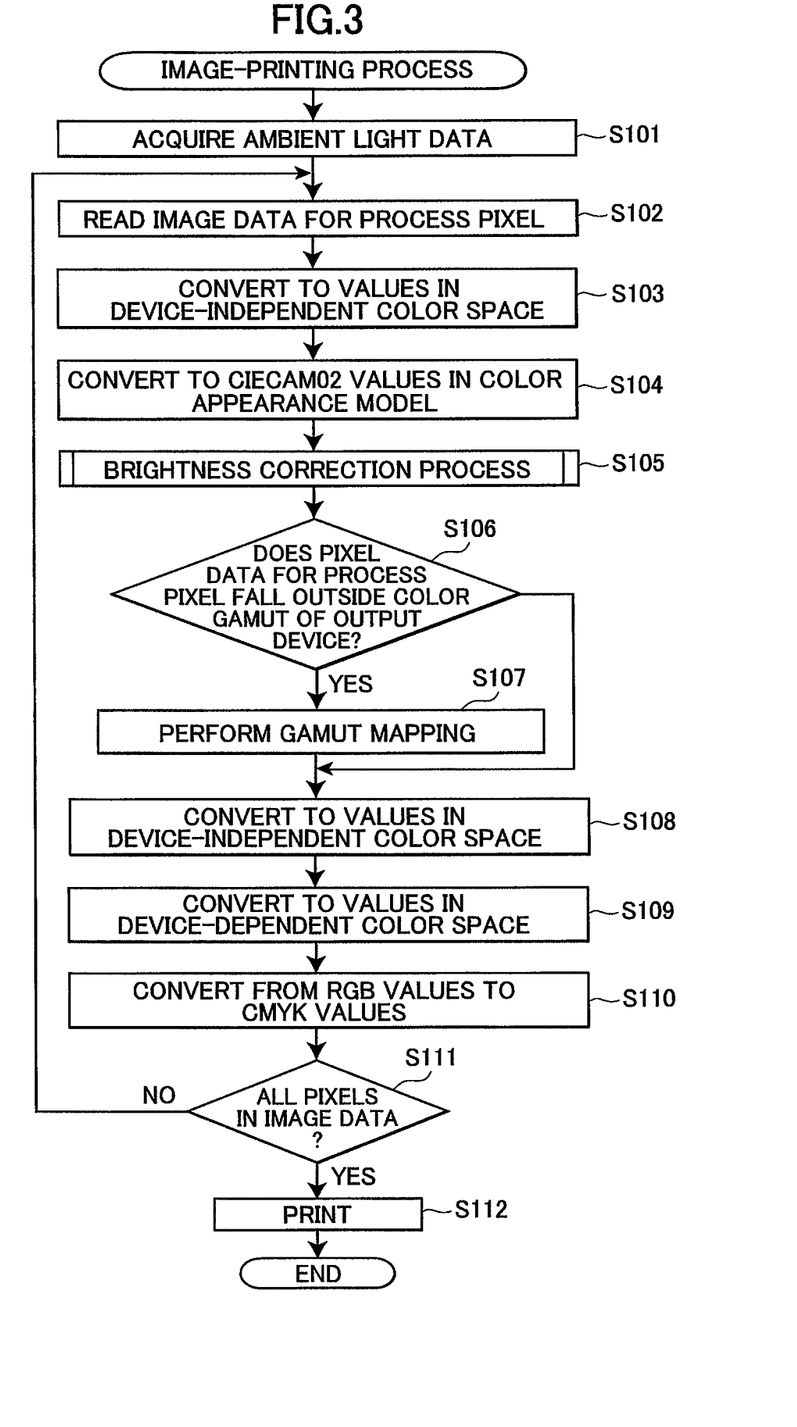
FIG. 3 is a flowchart illustrating steps in an image-printing process according to an embodiment of the present invention.

FIG. 3 is a flowchart illustrating steps in an image-printing process executed by the controller 21 of the MFP 2 (and specifically the CPU 211) when the MFP 2 receives a print command from the PC 1.

In S101 at the beginning of the image-printing process, the controller 21 acquires the target ambient light data (Xt, Yt, Zt) and the observation ambient light data (Xo, Yo, Zo). This is the data that the user has previously set using the PC 1.

In S102 the controller 21 specifies a pixel in the image represented by the RGB image data received from the PC 1 that has not yet undergone the process in S103-S110 described next, sets this pixel as the target pixel for this process (hereinafter referred to as the "process pixel") and reads the image data (Ri, Gi, Bi) for this process pixel.

In S103 the controller 21 converts the pixel data for the process pixel from RGB values to values in a device-independent color space (XYZ values (Xi, Yi, Zi) in the preferred embodiment) using an input device profile. In this case, the input device profile is a profile of the display unit 15 in the PC 1.

In S104 the controller 21 converts the pixel data (XYZ values) for the process pixel to CIECAM02 values (Ji, Cai, Cbi) using the target ambient light data acquired in S101, where the CIECAM02 values are values in a color appearance model.

In S105 the controller 21 executes a brightness correction process to correct the brightness of the image data based on positional relationship in the color space between the target ambient light data and the observation ambient light data. While the details of this brightness correction process will be described later with reference to FIG. 4, the process serves to correct the brightness of pixel data for the process pixel so that the brightness is increased as the color temperature of the observation ambient light is higher than the color temperature of the target ambient light and decreased as the color temperature of the observation ambient light is lower than the color temperature of the target ambient light.

In S106 the controller 21 determines whether the pixel data, that includes the corrected brightness in S105, for the process pixel falls outside the color gamut of the output device. In this case, the output device is the printing unit 27 of the MFP 2.

If the controller 21 determines in S106 that the pixel data falls outside the color gamut of the output device (S106: YES), then the controller 21 performs gamut mapping in S107 before advancing to S108. This gamut mapping may be implemented according to a method well known in the art.

However, if the controller 21 determines in S106 that the pixel data lies inside the color gamut of the output device (S106: NO), the controller 21 skips S107 and advances directly to S108.

In S108 the controller 21 converts the pixel data for the process pixel (CIECAM02 values) to XYZ values (Xj, Yj, Zj) using the ambient light data for the viewing environment. Since the color conversion process performed in S104 to convert XYZ values to CIECAM02 values was implementing using the target ambient light data, the controller 21 can perform ambient light correction on image data representing the image being printed so that the colors in the printed image under the target ambient light are reproduced under the observation ambient light.

In S109 the controller 21 converts the pixel data for the process pixel from the XYZ values to RGB values (Rj, Gj, Bj), which are values in a device-dependent color space, using the output device profile.

In S110 the controller 21 converts the pixel data for the process pixel from RGB values to CMYK values (Cj, Mj, Yj, Kj) using a three-dimensional look-up table (3D LUT).

In S111 the controller 21 determines whether the process in S103-S110 has been completed for all pixels in the image data.

If the process has not been performed on all pixels of the image data, the controller 21 returns to S102 (S111: NO), specifies a different pixel that has not yet been processed as the process pixel, and repeats the process in S103-S110.

However, if the controller 21 determines in S111 that the process has been completed for all pixels (S111: YES), in S112 the controller 21 performs a process to print an image based on the pixel data sets acquired by the process in S102-S110, and subsequently ends the current image-printing process.

Figure 4:
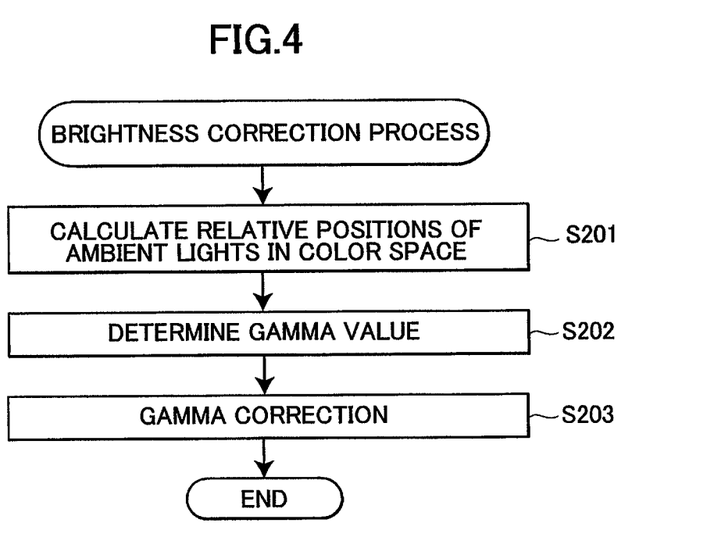
FIG. 4 is a flowchart illustrating steps in a brightness correction process according to an embodiment of the present invention.

Next, the brightness correction process executed by the controller 21 in S105 of the image-printing process described above will be described with reference to the flowchart in FIG. 4.

Figure 5:
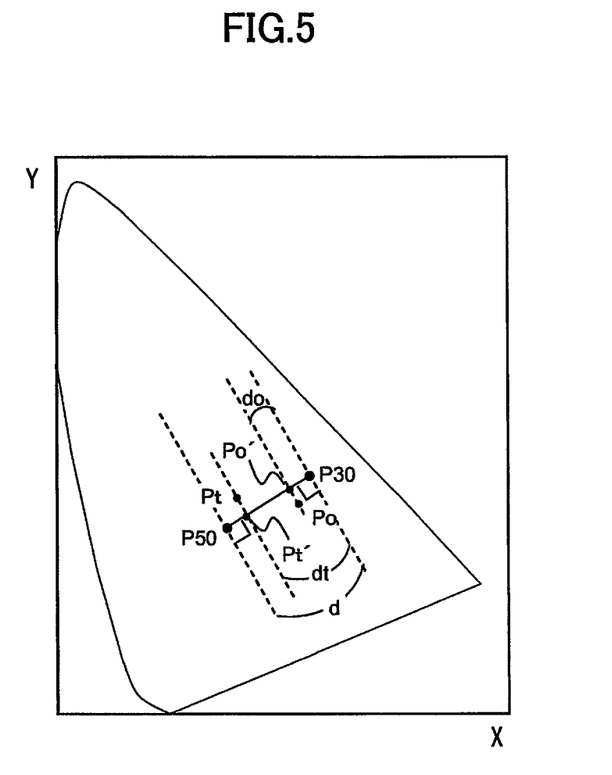
FIG. 5 is an explanatory diagram showing relative positions of the target ambient and the observation ambient light in CIE 1931 xy chromaticity diagram.

In S201 at the beginning of the brightness correction process, the controller 21 calculates relative positions of the target ambient light (Xt, Yt, Zt) and the observation ambient light (Xo, Yo, Zo) in the CIE 1931 xy chromaticity diagram. Specifically, as illustrated in FIG. 5, the controller 21 sets points Pt' and Po' by mapping a point Pt for the target ambient light and a point Po for the observation ambient light on a line segment connecting a point P30 for light having a color temperature of 3000K to a point P50 for light having a color temperature of 5000K in the xy chromaticity diagram. In this example, the points Pt' and Po' are mapped to intersections between the line segment and normals to the line segment passing through the respective points Pt and Po. The points P30 and P50 are connected by a straight line (line segment) because it is presumed that a portion of the black-body radiation curve approaches a straight line.

An optimum illuminance V(Pt) for the target ambient light and an optimum illuminance V(Po) for the observation ambient light are found by assigning 300 lux to the optimum illuminance V(P30) in lighting having a color temperature of 3000K and assigning 750 lux to the optimum illuminance V(P50) in lighting having a color temperature of 5000K based on the Kruithof effect shown in FIG. 6. However, settings for optimum illuminance are not limited to the values in this example.

More specifically, optimum illuminances V(Pt) and V(Po) can be found for the target ambient light and observation ambient light from Equations (1) and (2) below, where a distance d between the points P30 and P50 is normalized to 1, dt represents the distance between the points P30 and Pt', and do represents the distance between the points P30 and Po'.

Equation 1

$$V(Pt)=300\times(1-dt)+750\times dt \quad (1)$$

Equation 2

$$V(Po)=300\times(1-do)+750\times do \quad (2)$$

Hence, Equations (1) and (2) simplify the Kruithof effect for the color temperature of commonly used ambient lighting. By finding interpolation values for points Pt' and Po', it is possible to find the illuminances V(Pt) and V(Po) that approach optimum illuminances for points Pt and Po. Here, it is reasonable to find the illuminances V(Pt) and V(Po) that approach optimum illuminances since the boundary between pleasing and unpleasing light according to the Kruithof effect is somewhat vague.

Next, in S202 the controller 21 finds a gamma value to be used in the gamma correction process of S203 from Equation (3) below based on the illuminances V(Pt) and V(Po) calculated in S201. Equation (3) is found from Equation (4), which signifies that the integral after gamma correction divided by the integral before gamma correction equals the optimum illuminance at Po divided by the optimum illuminance at Pt. In other words, the controller 21 calculates a gamma value for changing the brightness of the printed image based on the ratio between the optimum illuminance for the color temperature of the target ambient light and the optimum illuminance for the color temperature of the observation ambient light.

Equation 3

$$\gamma = \frac{V(Po)}{2\times V(Pt)-V(Po)} \quad (3)$$

Equation 4

$$\frac{1\big/\frac{1}{\gamma}+1}{1/2} = \frac{V(Po)}{V(Pt)} \quad (4)$$

In S203 the controller 21 performs gamma correction on the brightness value Ji in the process pixel data (Ji, Cai, Cbi) using the gamma value calculated in S202 to obtain a corrected brightness Ji'. Subsequently, the controller 21 ends the current brightness correction process.

By performing gamma correction in this way, the controller 21 can correct brightness in the image data to a greater brightness as the color temperature of the observation ambient light is higher than the color temperature of the target ambient light and to a lesser brightness as the color temperature of the observation ambient light is lower than the color temperature of the target ambient light. By correcting only brightness in the image data, the appearance of the color hues is preserved.

4. Effects of the Embodiment

As described above, the MFP 2 according to the preferred embodiment performs ambient light correction to correct image data representing an image to be printed so that the colors in the printed image under the target ambient light are reproduced under the observation ambient light. In addition, the MFP 2 corrects the image data using a gamma value for adjusting the brightness of the printed image so that the printed image becomes brighter as the color temperature of the observation ambient light is higher than the color temperature of the target ambient light and becomes darker as the color temperature of the observation ambient light is lower than the color temperature of the target ambient light. More specifically, the MFP 2 changes the brightness of the printed image based on a ratio between the optimum illuminance for the color temperature of the target ambient light and the optimum illuminance for the color temperature of the observation ambient light, making the printed image brighter as the color temperature of the observation ambient light is higher than the color temperature of the target ambient light and darker as the color temperature of the observation ambient light is lower than the color temperature of the target ambient light.

Accordingly, the MFP 2 according to the preferred embodiment can correct the printed image to a suitable brightness based on the Kruithof effect, without simply correcting the difference in how colors of the printed image appear due to a difference in the ambient light at which the printed image is observed.

6. Another Embodiment

While the invention has been described in detail with reference to the specific embodiment thereof, it would be apparent to those skilled in the art that various changes and modifications may be made therein without departing from the spirit of the invention.

6-1. Color Space

In the preferred embodiment described above, gamut mapping is performed after converting the RGB values to CIECAM02 values. However, the color space in which gamut mapping is performed may be any uniform color space and is not limited to the CIECAM02 color space. A uniform color space is constructed so that the color difference perceived by humans is comparable to the Euclidean distance in the color space. Other examples of uniform color spaces are CIELAB and CIELUV.

6-2. Image-Printing Process

In the preferred embodiment described above, the MFP 2 performs an image-printing process based on the sequence of steps in S101-S112. However, this process may be simplified by first creating an LUT that defines correlations between the pixel data prior to executing the process in S103-S110 and the pixel data after executing these processes.

6-3. Image Data

In the preferred embodiment described above, the image data inputted in the MFP 2 is expressed in the RGB color space. However, the present invention may be applied to inputted image data expressed in another color space.

Further, it is not essential that the image data is transferred from the PC 1, as described in the preferred embodiment. For example, the image data may be generated by the scanning unit 26 of the MFP 2 or may be read from a memory card or other portable storage media when the MFP 2 is capable of directly reading image data from such media. Further, the MFP 2 may be configured to prompt the user to set ambient light data for the target and ambient light data for the observation environment so that the ambient light correction process can be executed on the MFP 2 without the MFP 2 being connected to the PC 1.

6-4. Ambient Light Data

In the preferred embodiment described above, the user is prompted to set ambient light data for a target and an observation environment as color temperatures or XYZ values. However, the user may also be allowed to select a type of lighting, for example, such as fluorescent lighting, incandescent lighting, and the like. Such a selection method may be more user-friendly than setting the color temperature.

It is also not essential that the user be required to set the ambient light data for the target and the observation environment. For example, the MFP 2 may be provided with a sensor for measuring ambient light and may automatically set the ambient light data based on the measured values. In this case, the MFP 2 may measure the ambient light data of the target using the sensor, while the user is prompted to input ambient light data for the observation environment.

It is also not essential that ambient light data (color temperature) be set for both the target and the observation environment. For example, the user may set a relative value comparing the ambient light data for the observation environment to the ambient light data for the target.

6-5. Printing Unit

In the preferred embodiment described above, the printing unit 27 is an inkjet device that prints images using the four ink colors C, M, Y, and K. However, the printing unit may be configured to use more colors of ink, for example. Further, the colorant is not limited to ink. For example, the printing unit may have a laser transfer system for forming images using toner in a plurality of colors.

6-6. Image Processor

In the preferred embodiment described above, the MFP 2 serves as an example of the image processor according to the present invention. However, the image processor may be a printing device that does not have a scanner function or the like. Further, the image processor is not limited to a printing device. For example, the PC 1 may also function as the image processor of the present invention. In this case, the printer driver 123 in the PC 1 executes the process described in S101-S111, for example, and the PC 1 subsequently transfers the processed image data to the MFP 2 for printing.

What is claimed is:

1. An image-processor comprising:
   an acquiring unit that acquires image data and ambient light data indicating a degree of a first color temperature with respect to a second color temperature, the first color temperature representing a color temperature for a first ambient light, and the second color temperature representing a color temperature for a second ambient light, wherein a first image, which corresponds to the image data, has a particular color appearance in the first ambient light, and the first image has another color appearance in the second ambient light; and
   a correcting unit that corrects the image data such that the particular color appearance of the first image under the first ambient light is reproduced under the second ambient light, wherein the correcting unit corrects the image data based on the ambient light data such that an image corresponding to the corrected image data becomes brighter when the second color temperature is greater than the first color temperature and a brightness of the image corresponding to the corrected image data increases as a difference between the first color temperature and the second color temperature increases, and such that the image corresponding to the corrected image data becomes darker when the second color temperature is less than the first color temperature and a darkness of the image corresponding to the corrected image data increases as the difference between the first color temperature and the second color temperature increases.

2. The image-processor according to claim 1, wherein the ambient light data indicates the first color temperature and the second color temperature.

3. The image-processor according to claim 1, wherein the first color temperature has a first optimum illuminance and the second color temperature has a second optimum illuminance, and
   wherein the correcting unit changes a brightness of the image data based on a ratio between the first optimum illuminance and the second optimum illuminance for the second color temperature.

4. An image-processing method comprising:
  acquiring image data and ambient light data indicating a degree of a first color temperature with respect to a second color temperature, the first color temperature representing a color temperature for a first ambient light, and the second color temperature representing a color temperature for a second ambient light, wherein a first image, which corresponds to the image data, has a particular color appearance in the first ambient light, and the first image has another color appearance in the second ambient light; and
  correcting the image data such that the particular color appearance of the first image under the first ambient light is reproduced under the second ambient light, wherein the image data is corrected based on the ambient light data such that an image corresponding to the corrected image data becomes brighter when the second color temperature is greater than the first color temperature and a brightness of the image corresponding to the corrected image data increases as a difference between the first color temperature and the second color temperature increases, and such that the image corresponding to the corrected image data becomes darker when the second color temperature is less than the first color temperature and a darkness of the image corresponding to the corrected image data increases as the difference between the first color temperature and the second color temperature increases.

5. A non-transitory, computer-readable storage medium storing a computer-executable image-processing program executable on an image-processor, the image-processing program comprising:
  instructions for the image-processor to acquire image data and ambient light data indicating a degree of a first color temperature with respect to a second color temperature, the first color temperature representing a color temperature for a first ambient light, and the second color temperature representing a color temperature for a second ambient light, wherein a first image, which corresponds to the image data, has a particular color appearance in the first ambient light, and the first image has another color appearance in the second ambient light; and
  instructions for the image-processor to correct the image data such that a color appearance of the first image under the first ambient light is reproduced under the second ambient light, wherein the instructions instruct the image-processor to correct the image data based on the ambient light data such that an image corresponding to the corrected image data becomes brighter when the second color temperature is greater than the first color temperature and a brightness of the image corresponding to the corrected image data increases as a difference between the first color temperature and the second color temperature increases, and such that the image based the corrected image data becomes darker when the second color temperature is less than the first color temperature and a darkness of the image corresponding to the corrected image data increases as the difference between the first color temperature and the second color temperature increases.

6. An image-processor comprising:
  an acquiring unit that acquires first image data and ambient light data indicating a degree of a first color temperature with respect to a second color temperature, the first color temperature representing a color temperature for a first ambient light, and the second color temperature representing a color temperature for a second ambient light, wherein a first image, which corresponds to the first image data, has a first color appearance in the first ambient light;
  a first converting unit that converts first image data based on the first color temperature to second image data;
  a correcting unit that corrects the second image data such that an image corresponding to the corrected second image data becomes brighter when the second color temperature is greater than the first color temperature and a brightness of the image corresponding to the corrected second image data increases as a difference between the first color temperature and the second color temperature increases, and such that the image corresponding to the corrected second image data becomes darker when the second color temperature is less than the first color temperature and a darkness of the image corresponding to the corrected second image data increases as the difference between the first color temperature and the second color temperature increases; and
  a second converting unit that converts the corrected second image data based on the second color temperature to third image data, wherein a second image, which corresponds to the third image data, has a second color appearance in the second ambient light, and the first color appearance is the same as the second color appearance.

* * * * *